Jan. 28, 1969  B. STROM ET AL  3,423,887
HONING METHOD
Filed Jan. 14, 1966
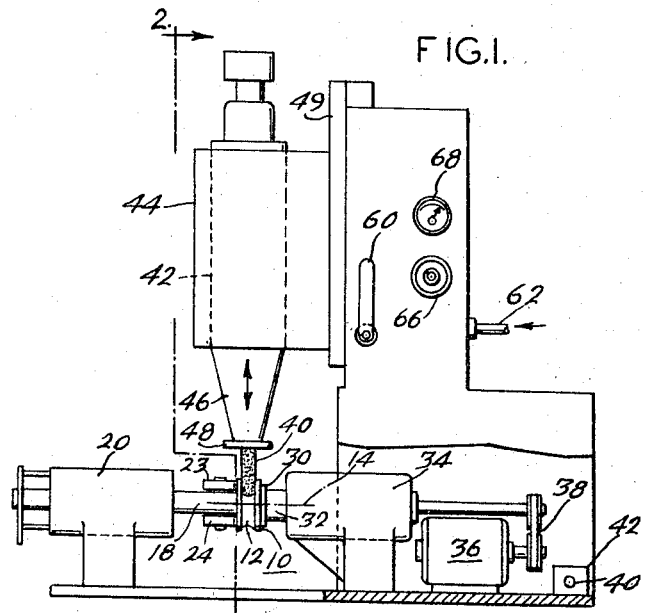
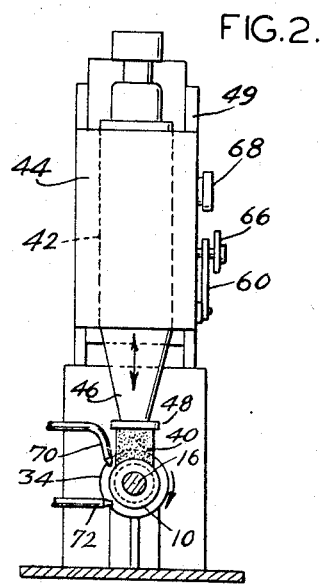
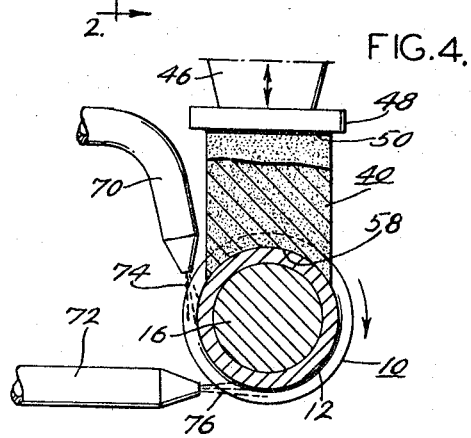
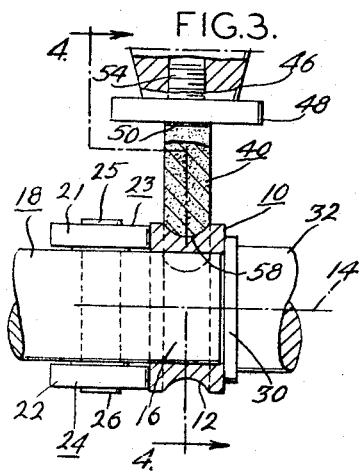
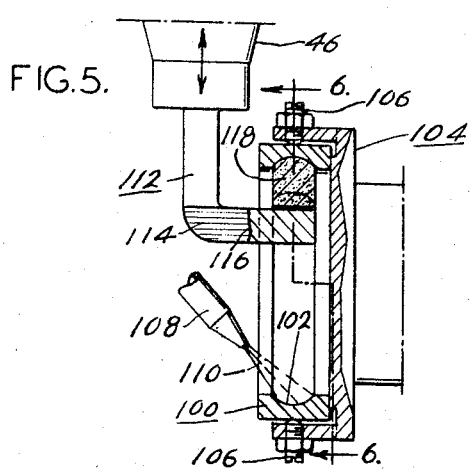
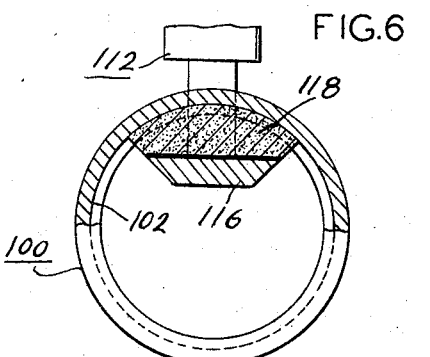
INVENTORS:
NORBERT V. RADTKE
BERTIL STROM
BY Howson & Howson
ATTYS.

United States Patent Office 3,423,887
Patented Jan. 28, 1969

3,423,887
HONING METHOD
Bertil Strom, Lutherville, and Norbert V. Radtke, Timonium, Md., assignors to SKF Industries, Inc., King of Prussia, Pa., a corporation of Delaware
Filed Jan. 14, 1966, Ser. No. 520,578
U.S. Cl. 51—289                                11 Claims
Int. Cl. B24b 1/00, 7/00, 9/00

ABSTRACT OF THE DISCLOSURE

A method for honing a surface of a body which is a figure of revolution about an axis of revolution, for example an annular groove for ball bearings where often curvature across the groove differs from the curvature around the axis of revolution, to minimize waviness in the surface, comprising spinning the body about said axis while urging against a portion of its surface an abrasive stone shaped to fit the desired contour of the surface along and across the direction of spinning of said surface, and simultaneously vibrating the abrasive stone along the direction in which it is being urged. Preferably the stone extends over a substantial fraction of the circumference of the surface (for example, one third of the circumference), and is vibrated in the 5,000 to 30,000 vibrations per second range; preferably also, a liquid material is applied to the surface passing under the stone so that cavitation of the liquid material occurs to prevent "load-up" of the stone.

---

This invention relates to methods for honing materials, and particularly to methods for honing the annular grooves or raceways of rolling bearings to minimize "waviness" or departures from circularity in the surfaces thereof.

There are a variety of practical applications in which it is desirable to provide honing of a body surface which is a figure of revolution; a particular example of such an application, with particular reference to which the invention will be described, arises in connection with the honing of the grooves or raceways in the rings of rolling bearings in which the rolling elements move. The latter grooves are typically first formed by machining operations which, while quite accurate, have been found to leave a slight residual "waviness" representing departures from perfect circularity. For example, in some instances a few to a hundred or more slight peaks may occur along the circumference of the groove. Even though this waviness is often extremely small, it can manifest itself in a number of undesirable ways when the bearing is put into actual service, particularly with relation to noise and vibration characteristics.

Accordingly efforts have been made in the past to minimize such waviness by rotating the bearing ring about the axis of the annular groove therein while applying an abrasive grinding stone to the groove surface; in most cases the stone is oscillated along or transverse to the groove during the honing operation. However such methods have been found to be less effective than is desirable in minimizing waviness and other departures from circularity, and usually present operating problems with respect to such factors as providing the necessary motion of the stone and preventing or correcting loading-up of the stone by the products resulting from the abrasive action.

Accordingly it is an object of the invention to provide a new and useful method for honing the surfaces of bodies.

Another object is to provide a new and useful method for honing the surface of a body which is a figure of revolution.

A further object is to provide a new and useful method for honing the grooves or raceways of ball and roller bearing rings and also for honing rolling elements such as spherical rollers.

Another object is to provide such a method which is particularly effective in minimizing the waviness, or departures from circularity, of said surface.

Another object is to provide such a method which provides an especially rapid honing action.

A further object is to provide a new and useful honing method in which an abrasive stone is applied to the rotating surface of the body to be honed, and in which the rate of loading-up of the stone is reduced and improvements thereby made possible in the speed and effectiveness of honing.

In accordance with the invention, the above objects are achieved by the provision of a method of honing a surface of a body which is substantially a figure of revolution, which comprises spinning the body about the axis of revolution of the surface and urging an abrasive body against said surface while vibrating the abrasive body along the direction in which it is being urged; preferably a liquid is provided at the surface against which the vibrating abrasive body is urged, and the frequency of the vibration is sufficiently high to produce cavitation in the liquid material adjacent the vibrating abrasive body. Preferred vibrating frequencies are in a range between about 5,000 and 30,000 vibrations per second.

In the preferred form of the invention in which the method is used to hone an annular bearing groove in a ring for a ball-bearing assembly, the ring is spun about the axis of the annular groove and an abrasive stone, shaped to fit both the transverse and circumferential shape of the groove, is urged against the groove and vibrated normal to the surface of the groove, the vibrating stone preferably extending approximately one third the distance around the circumference of the groove.

This type of honing, while relatively easy to perform, provides substantial improvements not only in the quality of the honed surfaces but also in the speed with which honing can be accomplished, and has widened the range of hardness of materials which can be successfully honed. The cavitation resulting from the vibrating motion of the stone has the effect of continuously removing from the stone interstices the metallic particles removed from the rotating body by the abrasive action, thereby preventing glazing or "loading-up" of the stone, and as a result the stone continues to be effective to produce rapid honing over long periods of time. The cavitation action also apparently produces some degree of crumbling of the surface of the stone so that the abrasive particles in the cavitated liquid are impinged against the body being honed, thereby further contributing to the rapid and uniform honing action. In the preferred form of the invention liquid is applied to the rotating part by means of one or more jets, preferably directed substantially tangentially to the rotating surface to be honed and oppositely to the direction of motion of the surface due to its rotation.

Further objects and features of the invention will be more readily understood from a consideration of the following detailed description, taken in connection with the accompanying drawings, in which:

FIGURE 1 is a front elevational view, with parts broken away, of a complete apparatus which may be employed in applying the method of the invention to the honing of raceways in the inner ring of a bearing;

FIGURE 2 is a sectional view of the apparatus of FIGURE 1, taken along the line 2—2;

FIGURE 3 is an enlarged fragmentary view, partly in section, of a portion of the arrangement shown in FIGURE 1, illustrating one manner in which the invention may be applied;

FIGURE 4 is a sectional view of the apparatus shown in FIGURE 3, taken along line 4—4;

FIGURE 5 is a fragmentary view, partly in section, illustrating another manner in which the invention may be applied to hone the raceway in the outer ring of a bearing; and FIGURE 6 is a sectional view of the apparatus shown in FIGURE 5, taken along the line 6—6.

Referring now particularly to FIGURES 1–4 of the drawings, which illustrate one form of apparatus which may be used in practicing the method of the invention, there is shown a ring 10 having an annular groove or raceway 12 and which is of a type commonly used as the inner ring of a ball or roller bearing assembly; this inner ring is used in connection with an internally-grooved outer ring to provide a generally annular space between the rings, in which space are mounted rolling elements such as balls or rollers. Merely by way of example, the outer diameter of the ring 10 may be about two inches and the annular groove or raceway 12 therein may be such as to accommodate ¼-inch diameter balls. It is understood that other types of rolling elements may be utilized in other rolling bearing types.

In this example it is assumed that the inner ring 10 has previously been machined to produce the groove 12 therein in conventional manner, starting with a centrally-apertured hard metal cylinder which, for example only, may be composed of 52100 steel. This pre-machined ring typically has a number of irregularities, or departures from perfect circularity, along the circumference of the groove 12 which constitute a "waviness" which detracts from optimum operation of the complete bearing assembly of which the inner ring 10 is to be a part. Except for such minor imperfections due to surface waviness, the surface of the annular groove 12 comprises a figure of revolution about the axis 14 of the groove.

Ring 10 is supported for honing by sliding it over the protruding end 16 of a cylindrical arbor 18 when the latter arbor is retracted to the left in the tail stock assembly 20. When so positioned, one face of ring 10 bears against the freely-rotating outer rings 21 and 22 of radial ball-bearing assemblies 23 and 24, respectively. Ball-bearing assemblies 23 and 24 have their inner rings secured to radially-extending arms 25 and 26, respectively, one arm on each side of arbor 18. Appropriate lubrication is preferably provided between the inner surface of ring 10 and the end portion 16 of arbor 18 on which it is mounted, so that the ring 10 can rotate freely about the arbor end 16. Arbor 18 can reciprocate along its axis for loading purposes, but cannot rotate. After inner ring 10 has been placed over the arbor end 16 with the arbor 18 in its retracted position, the arbor 18 is advanced and urged to the right in FIGURE 1, as by means of an air cylinder in tail stock assembly 20, until the opposite or right-hand side of ring 10 bears against the circular friction-drive plate 30 secured to the end of the rotatable shaft 32, the force exerted by arbor 18 being sufficient to provide friction drive of ring 10 when shaft 32 is rotated.

Shaft 32 is supported for rotation in an appropriate bearing assembly 34, and is rotated by means of motor 36 and a pulley-and-belt arrangement 38 at a speed determinable by the adjustment of the control knob 40 on speed control box 42. Speed control box 42 may include any appropriate electrical circuitry for controlling the speed of motor 36, such arrangements being well known in the art.

In accordance with the invention, while the ring 10 is rotated about the horizontal axis 14 in response to operation of motor 36, a pre-shaped abrasive stone 40 is urged downwardly against the groove 12 of ring 10 and at the same time vibrated up and down by means of a vibrator 42 in carriage 44. More particularly, the vibrator 42 may be a piezoelectric vibrator operative at frequencies of about 15,000 cycles per second, the mechanical output of which is applied by way of amplifying horn 46 to a stone holder 48 on the lower surface of which the stone 40 is secured, as by means of epoxy cement 50. The horn 46 may be of solid metal such as stainless steel, and the stone holder 48 may be a metal disc having an integral upwardly-extending threaded stud 54 which can be screwed into corresponding mating internal threads in a central bore in the bottom of horn 46. Types of vibrators other than the piezoelectric type may of course be used instead, for example magnetostrictive vibrators.

In the present example the stone 40 may be in the general form of a block having a flat upper surface cemented to the stone holder 48, and a lower surface 58 which is curved along the width dimension of the block to conform to the desired circular circumferential shape of the annular groove 12 to be honed and which is shaped along the thickness dimension of the block to conform to the transverse shape of the annular groove 12. The thickness of the stone 40 should accurately match the width of the annular groove for best results. The width dimension of the stone 40 is accurately aligned at right angles to the axis 14 around which the ring 10 is rotated in any convenient manner, as by means of shims or indexing elements applied to the stone holder or by rotating the entire vibrator 42 in its supporting carriage 44.

To permit raising and lowering of the stone 40 in and out of the groove in ring 10, the carriage 44 in the present example is mounted on a track 49 along which it can move in a vertical direction. The carriage 44 can be raised or lowered at will by operation of the control arm 60, which may for example operate a conventional cam arrangement to raise or lower a stop which arrests or limits downward travel of the carriage, while leaving the carriage free to be urged upwardly pneumatically in response to pneumatic pressure supplied by way of pneumatic inlet line 62. The extent of the pneumatic lifting effect is manually controllable by means of the air valve control handle 66 and is indicated by the air-pressure meter 68. This lifting effect may be used to reduce the net downward force exerted by the abrasive stone on the raceway due to the weight of carriage 44 and its contents, or in some cases to produce a net upward force as when an internal raceway on an outer bearing ring is to be honed.

A pair of nozzles 70 and 72 are provided to apply jets of a coolant, such as kerosene, to the groove 12 as the ring 10 rotates, as shown particularly clearly in FIGURE 4. Nozzle 70 forms a jet 74 which impinges on the groove 12 substantially tangentially at the extreme left or "9 o'clock position," while nozzle 74 forms a jet 76 which impinges on the groove 12 substantially tangentially at the bottom or "6 o'clock position," both jets being directed oppositely to the clockwise direction of rotation of the ring 10 as shown in FIGURE 4.

Utilizing the above-described apparatus, the method of the invention in one of its forms may be practiced as follows. First a suitably shaped abrasive stone is produced in the following way. With the control arm 60 operated to raise carriage 44 and vibrator 42 out of the working position, a stone holder 48 carrying a rectangular stone 40 cemented to the undersurface thereof is screwed into position on the underside of horn 46 and aligned transverse to the axis of rotation 14 of shaft 32. Arbor 18 is retracted to the left and a bearing ring having a groove of the size and shape to be honed is slipped over the lubricated end 16 of arbor 18. Arbor 18 is then advanced to the right to force the right-hand side of ring 10 against the friction drive plate 30 and the motor 36 is started to spin the ring 10 at an appropriate speed, which may be 3600 revolutions per minute in the present example. With pneumatic pressure control handle 66 adjusted to provide the desired net downward force, lever 60 is then operated to allow carriage 44 to move downwardly into working position in which the rectangular stone 40 bears against the upper side of the spinning groove 12 with a pressure determined by the difference between the downward thrust produced by the weight of the carriage 44 and its contents moving on track 49 and the upward thrust exerted by the pneumatic arrangement described above.

The grooved portion of the rotating ring will then effectively "eat into" the previously flat underside of the stone 40 until the latter underside assumes the conforming shape illustrated in FIGURE 4, which fits the groove 12 both circumferentially and laterally. The arm 60 may then be operated to raise the stone out of working position and the ring removed and discarded. The stone is then properly shaped for the subsequent treatment of other similarly-grooved rings.

Next a ring to be honed and having a groove 12 substantially identical with that used to shape the lower edge of the stone is placed in position on arbor end 16 and rotated in the manner described by friction plate 30. The stone is then lowered against the rotating groove 12 while vibrating up and down as described above, to provide honing of the surface of the groove. A typical time duration for the honing process on each such ring may be about three seconds.

As an example only, the stone 40 may be a sulphur-treated, soft grade, 1,000-grit, silicon carbide stone, one inch wide, about ⁹⁄₁₆ inch in thickness as determined by the groove which is to be honed, and about 1¼ inches in length. Using the above-described procedure and exemplary parameters, about 900 such rings may be honed sequentially with each stone, after which the stone holder is unscrewed, a new stone holder carrying a new stone is inserted in the bottom of horn 46, and the above-described process repeated.

As an example only, the full weight of the carriage and vibrator assembly acting downwardly may be about 90 pounds, and the opposing pneumatic pressure about 50 pounds, leaving a net downward weight of 40 pounds acting between the vibrating stone and the groove 12 in ring 10.

Use of the described form of the method has improved total roundness of the groove by about 200% and has increased the rate of removal of the metal from the ring by a factor of about 2 to 3 times as compared with conventional oscillating honers.

The body treated by this process need not be the 52100 steel mentioned above, and in fact may be a material other than steel. Various sizes of rings and grooves may be honed, the size and shape of the stone being altered accordingly and the motor speed used preferably being adjusted to provide the same circumferential speed of the groove relative to the stone. Similarly, the downward steady pressure exerted during honing may be varied substantially, usually being lower for smaller rings; higher pressures ordinarily produce more rapid rates of material removal.

The frequency of vibration of the stone may also be varied substantially; for example vibration frequencies in a range from about 5,000 to 30,000 vibrations per second may be used in various applications, although it has been found that a frequency of the order of 15,000 vibrations per second is preferable for many purposes. The frequency employed is ordinarily determined by the particular form of vibrator utilized; such vibrators are commercially available for operation at a variety of frequencies, the frequency employed normally being a predetermined resonant frequency which is to some extent modified by the size and weight of the horn, stone holder and stone attached thereto. Such considerations are well known to those skilled in the art and need not be set forth here in detail.

A typical amplitude of vibration of the stone during the honing process is about 0.0002 inch, although amplitudes from about 0.0001 to 0.0006 inch have also been used successfully.

The use of liquid jets directed tangentially against the groove opposite to the direction of rotation provides a further improvement in removal of any remaining metal grits in the groove being honed, thus serving effectively continuously to clean the groove of such materials.

The method may also be applied to the honing of the groove on the inner side of the outer ring for a rolling bearing, as illustrated with respect to FIGURES 5 and 6. In this case the outer ring 100 with the annular raceway groove 102 preformed on its inner surface is mounted for rotation in a multiple-armed chuck 104 by means of a number of peripherally-spaced set screws such as 106. This arrangement for holding the ring has been shown for simplicity of explanation, it being understood that other known holding arrangements may be utilized instead. Chuck 104 may be rotated by the motor drive arrangement represented in FIGURE 1 so as to spin the ring 100 about the axis of groove 102. The nozzle 108 provides a jet 110 of coolant which also serves as the liquid which is cavitated during passage under the vibrating stone. In order to apply the stone to the inner raceway, the stone holder 112 secured to the underside of transducer-horn assembly 46 has a right-angle bend 114 providing a horizontal arm 116 on the upper surface of which the stone 118 is mounted. The stone is positioned in the vertical dimension by raising or lowering the transducer-horn assembly 46 mechanically, for example as described with respect to the apparatus of FIGURE 1, and may be moved in or out of the ring 100 either by reciprocating chuck 104, by translating the entire vibrator-supporting carriage assembly, or by rotating the stone holder or the transducer assembly. In this example, the required upward pressure of the stone against the groove may be provided by adjusting pneumatic pressure control 66 of FIGURE 1 to produce a pressure which urges the vibrator-carriage assembly upward with a force in excess of its weight, so as to produce a net upward thrust. The manner in which the stone is shaped and later used to hone the groove may be substantially the same as described previously with respect to the honing of grooves in inner rings.

The figures illustrate one form of apparatus which may be employed to practice the invention, but it should be understood that there are many other possible forms of apparatus suited for this purpose and in particular that the process lends itself readily to complete automation including loading and unloading of rings from the arbor on which they are honed.

While the invention has been described with particular reference to specific embodiments thereof in the interest of definiteness, it will be understood that it may be embodied in any of a variety of different forms diverse from those specifically illustrated and described without departing from the spirit and scope of the invention as defined by the appended claims.

We claim:
1. The method of honing a surface of a body which is substantially a figure of revolution generated by rotation about a predetermined axis of a line having portions spaced along the direction of said axis which are at substantially different radial distances from said axis, comprising the steps of:
   spinning said body about said axis while urging against a portion of said surface an abrasive body shaped to closely fit and mate with said portion of said surface along and across the direction of spinning of said surface, and simultaneously vibrating said abrasive body along the direction of said urging, the force of said urging being such as to produce honing of said surface.

2. A method in accordance with claim 1, comprising the step of providing a liquid material at said surface of said body to be honed.

3. A method in accordance with claim 2, in which said vibration is at a frequency high enough to produce cavitation of said liquid material beneath said vibrating abrasive body, and comprising the step of constantly flushing accumulated debris from said surface of said body at a position spaced around said body from said stone.

4. A method in accordance with claim 3, in which said vibration is at a frequency between about 5,000 and 30,000 vibrations per second.

5. The method of claim 1, comprising holding said abrasive body substantially fixed against motion along said axis during said spinning and said vibrating steps.

6. The method of honing an annular bearing groove in a ring for a rolling bearing assembly, comprising: spinning said ring about the axis of said annular groove, and urging against the surface of said groove of said spinning ring an abrasive stone shaped to fit closely and mate with the transverse and circumferential shape of said surface while vibrating said stone along the direction of said urging and while providing a liquid material at the portion of said surface passing under said stone, the force of said urging being such as to produce honing of said surface.

7. A method in accordance with claim 6, in which said vibration is at a frequency high enough to produce cavitation of said liquid material and in which said spinning is at a low rate compared with said frequency of vibration, and comprising the step of constantly flushing accumulated debris from said surface at a position spaced around said ring from said stone.

8. The method of claim 6, in which said abrasive stone extends along, and conforms to, a substantial fraction of the circumference of said groove.

9. The method of honing an annular bearing groove of curved cross-section in a rolling bearing ring of hard metal, comprising the steps of: spinning said ring about the axis of said groove while urging against the surface of said groove an abrasive stone shaped to fit closely and mate with said groove transversely and circumferentially along approximately one third of the circumference of said groove, and providing a liquid material at the surface of said groove passing under said stone while vibrating said stone along the direction perpendicular to said axis and normal to said surface at a frequency sufficiently high to produce cavitation of said liquid material, said spinning of said race being at a low rate compared with the frequency of said vibration and the force of said urging being such as to produce honing of said surface.

10. A method in accordance with claim 9, in which said providing of said liquid material comprises applying at least one jet of said liquid material approximately tangential to said surface of said groove in a direction opposite to the direction of motion of said groove due to said spinning.

11. A method in accordance with claim 10, in which said frequency of vibration is between about 5,000 and 30,000 vibrations per second.

References Cited

UNITED STATES PATENTS

| | | | |
|---|---|---|---|
| 2,195,047 | 3/1940 | Wallace | 51—67 |
| 2,244,806 | 6/1941 | Schmidt | 51—67 |
| 2,302,105 | 11/1942 | Connor | 51—67 |
| 2,766,364 | 10/1956 | Higgins et al. | 219—69 |
| 2,858,652 | 11/1958 | Luthman et al. | 51—59 X |
| 3,123,950 | 3/1964 | Kuris et al. | 51—262 |

LESTER M. SWINGLE, *Primary Examiner.*

U.S. Cl. X.R.

51—59, 291